US010901608B2

(12) United States Patent
Shi et al.

(10) Patent No.: US 10,901,608 B2
(45) Date of Patent: Jan. 26, 2021

(54) METHOD FOR RECOGNIZING A SCREEN-OFF GESTURE, AND STORAGE MEDIUM AND TERMINAL THEREOF

(71) Applicant: GUANGDONG OPPO MOBILE TELECOMMUNICATIONS CORP., LTD., Guangdong (CN)

(72) Inventors: Rendong Shi, Guangdong (CN); Tong Han, Guangdong (CN); Hao Wang, Guangdong (CN); Mingqiang Guo, Guangdong (CN); Qiang Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 144 days.

(21) Appl. No.: 16/046,011

(22) Filed: Jul. 26, 2018

(65) Prior Publication Data
US 2019/0034074 A1 Jan. 31, 2019

(30) Foreign Application Priority Data
Jul. 28, 2017 (CN) .......................... 2017 1 0633677

(51) Int. Cl.
*G06F 3/0488* (2013.01)
*G06F 3/01* (2006.01)
(Continued)

(52) U.S. Cl.
CPC ........ *G06F 3/04883* (2013.01); *G06F 1/3234* (2013.01); *G06F 3/017* (2013.01); *G06F 3/0484* (2013.01)

(58) Field of Classification Search
CPC .............................. G06F 1/3234; G06F 3/0484
See application file for complete search history.

(56) References Cited

U.S. PATENT DOCUMENTS 6,057,845 A * 5/2000 Dupouy ................ G06F 3/0481
382/186
8,638,190 B1 * 1/2014 Want ....................... G06F 3/046
340/5.1
(Continued)

FOREIGN PATENT DOCUMENTS

CN 103902101 A 7/2014
CN 104102450 A 10/2014
(Continued)

OTHER PUBLICATIONS

International Search Report in international application No. PCT/CN2018/097407, dated Nov. 1, 2018.
(Continued)

*Primary Examiner* — William Boddie
*Assistant Examiner* — Bipin Gyawali
(74) *Attorney, Agent, or Firm* — Ladas & Parry LLP

(57) ABSTRACT

A method for recognizing a screen-off gesture, and a storage medium and a terminal thereof are disclosed. The method includes reading, when it is detected that the user inputs a screen-off gesture, gesture data of the screen-off gesture from the touch chip according to a set period. The method also includes determining, when the gesture data satisfies a preset matching condition and does not contain a preset end identifier, a screen-off gesture trajectory based on gesture coordinates that have been read. Furthermore, the method includes matching the screen-off gesture trajectory with each preset gesture trajectory in the preset gesture trajectory set. Moreover, reading operation of the gesture data is stopped when the screen-off gesture trajectory does not match any of the preset gesture trajectories in the preset gesture trajectory set.

19 Claims, 10 Drawing Sheets

(51) Int. Cl.
*G06F 3/0484* (2013.01)
*G06F 1/3234* (2019.01)

(56) References Cited

U.S. PATENT DOCUMENTS

| | | | |
|---|---|---|---|
| 9,542,820 B2 | 1/2017 | Moussette et al. | |
| 9,830,784 B2 | 11/2017 | Moussette et al. | |
| 9,928,699 B2 | 3/2018 | Moussette et al. | |
| 10,082,950 B2* | 9/2018 | Lapp | G06F 3/04883 |
| 10,126,827 B2* | 11/2018 | Ho | G06F 3/017 |
| 2010/0120536 A1* | 5/2010 | Chatellier | G07F 17/3276 463/40 |
| 2012/0212435 A1* | 8/2012 | Bae | G06F 1/3206 345/173 |
| 2014/0002376 A1* | 1/2014 | Oliver | G06F 3/016 345/173 |
| 2015/0248166 A1* | 9/2015 | Mayanglambam | G06F 3/017 345/173 |
| 2015/0261280 A1 | 9/2015 | Hsiao et al. | |
| 2015/0261318 A1* | 9/2015 | Scavezze | G06F 3/0346 345/158 |
| 2016/0062464 A1 | 3/2016 | Moussette et al. | |
| 2016/0062465 A1 | 3/2016 | Moussette et al. | |
| 2016/0062466 A1 | 3/2016 | Moussette et al. | |
| 2016/0063825 A1 | 3/2016 | Moussette et al. | |
| 2016/0063827 A1 | 3/2016 | Moussette et al. | |
| 2016/0063828 A1 | 3/2016 | Moussette et al. | |
| 2017/0285755 A1* | 10/2017 | Churchill | G06F 3/017 |
| 2018/0082552 A1 | 3/2018 | Moussette et al. | |

FOREIGN PATENT DOCUMENTS

| | | |
|---|---|---|
| CN | 104460999 A | 3/2015 |
| CN | 1049332811 A | 9/2015 |
| CN | 106575230 A | 4/2017 |
| CN | 107479816 A | 12/2017 |

OTHER PUBLICATIONS

Written Opinion of the International Search Authority in international application No. PCT/CN2018/097407, dated Nov. 1, 2018.
European Search Report in European application No. 18186086.7, dated Dec. 4, 2018.
CN104460999 A _ English Abstract.
First Chinese Office Action dated May 6, 2019 for Application No. CN 201710633677.2.
Office Action of the Indian application No. 201814028368, dated Sep. 30, 2020.
Office Action of the European application No. 18186086.7, dated Oct. 30, 2019.

* cited by examiner

METHOD FOR RECOGNIZING A SCREEN-OFF GESTURE, AND STORAGE MEDIUM AND TERMINAL THEREOF

CROSS REFERENCE TO RELATED APPLICATIONS

This application claims the priority benefit of Chinese Patent Application No. 201710633677.2, titled "METHOD FOR RECOGNIZING A SCREEN-OFF GESTURE, AND APPARATUS, STORAGE MEDIUM AND MOBILE TERMINALTERMINAL THEREOF" and filed on Jul. 28, 2017, the contents of which are incorporated by reference herein in their entirety for all purposes.

TECHNICAL FIELD

Embodiments of the present disclosure relates to mobile terminal technologies, and in particular, to a method, a terminal and a storage medium for recognizing a screen-off gesture.

BACKGROUND TECHNOLOGY

With the development of science and technology, various types of electronic devices with touch screens, such as smartphones, tablets, or handheld game consoles are widely used. The touch technology used in these devices provides people with convenient input methods and brings great convenience.

The functions developed based on the touch screen are also increasing, and among others, the screen-off gesture is one of representative and futuristic technologies. The so-called screen-off gesture is a function that a user draws certain specific patterns on the touch screen to achieve quick opening of an application without requiring a bright screen. However, the screen-off gestures bring convenience to the user but also cause excessive power consumption at the same time.

DETAILED DESCRIPTION OF THE EMBODIMENTS

Figure 1:
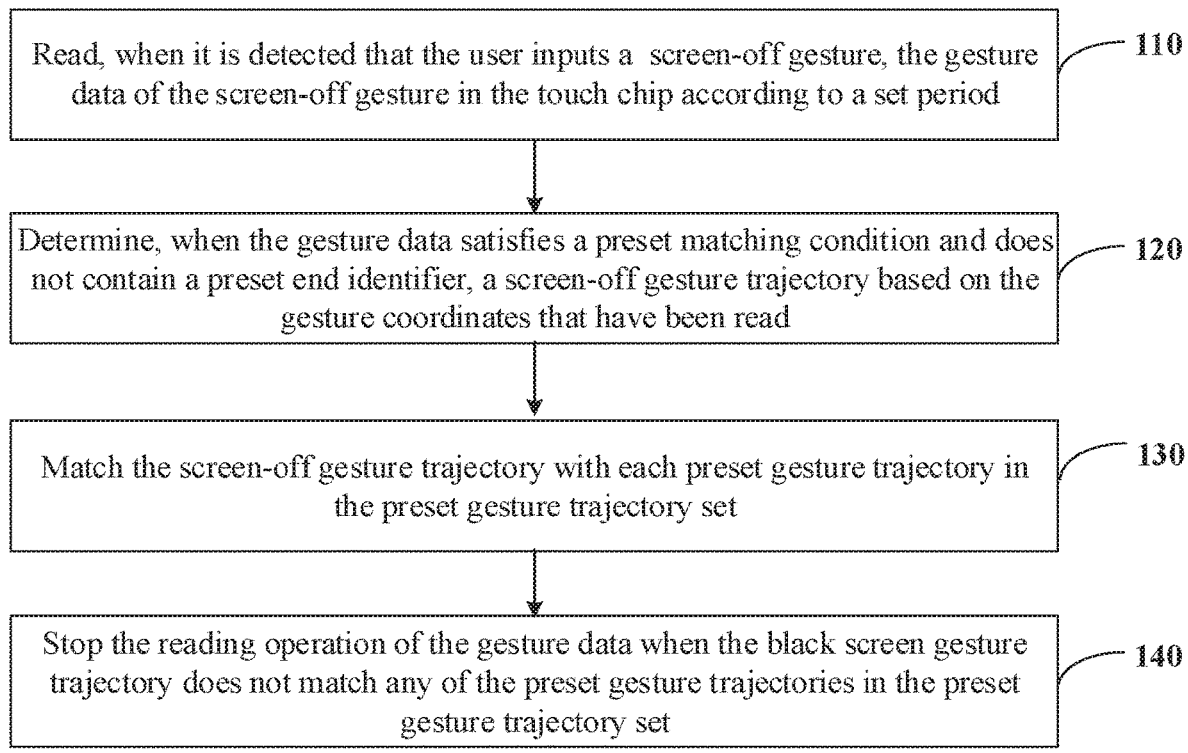
FIG. 1 is a flow diagram of a method for recognizing a screen-off gesture according to an embodiment of the present disclosure.

The present disclosure will be further described in detail below with reference to the accompanying drawings and embodiments. It can be understood that the specific embodiments described herein are only used to explain the present disclosure and not to limit the present disclosure. It should also be noted that for ease of description, only some but not all of the structures related to the present disclosure are shown in the drawings.

Before discussing the exemplary embodiments in more detail, it should be mentioned that some exemplary embodiments are described as a process or method depicted as a flow diagram. Although a flow diagram describes the steps as a sequential process, many of the steps may be performed in parallel, concurrently or simultaneously. In addition, the order of the steps can be rearranged. The process may be terminated when its operation is completed, but it may also have additional steps not included in the drawings. The processing may correspond to methods, functions, procedures, subroutines, subprograms or the like.

A screen-off gesture function is that when the terminal (for example, a smart phone) is in a sleep mode with the screen turned off, the touch screen operates in a low power consumption state to detect a screen-off gesture on the turned-off touch screen, and wakes up a function of the smart phone according to the screen-off gesture or enables the function of a preset application corresponding to the type of the screen-off gesture. To facilitate the understanding of the screen-off gesture function, the following describes the process from detection of the screen-off gesture in a state of turned-off screen to the enablement of an application corresponding to the screen-off gesture by the application layer. The process includes: storing a gesture data corresponding to the screen-off gesture into a preset node of the drive layer, wherein the gesture data includes gesture coordinates and gesture types; performing the screen-off gesture data validity determination by the drive layer; if it is valid, performing a black frame gesture event dispatch by the framework layer; reading the gesture coordinates from the preset node in the drive layer by the application layer after the application layer has received the black screen screen-off gesture event, calculating the animated screen-off gesture trajectory based on the gesture coordinates and gesture type, transmitting the animated trajectory data to a FrameBuffer to refresh the animated trajectory to the touch screen according to the set screen refresh rate for display; subsequently, performing an operation of activating an application corresponding to the screen-off gesture.

In the above screen-off gesture recognition process, as long as there is a user's gesture input operation, the drive layer will read the gesture data. However, when the gesture input by the user is not enabled or when the user inputs an arbitrary gesture accidentally due to a mistaken operation, the gesture data is also read and recognized by the drive layer. Then the drive layer will read the gesture data when the application layer has received the screen-off gesture event reported by the drive layer, which cause a waste of the processing resource of the application layer. The method for recognizing a screen-off gesture according to the embodiments of the present disclosure can solve the problem of waste of resources caused by unnecessary data reading described above.

FIG. 1 is a flow diagram of a method for recognizing a screen-off gesture according to an embodiment of the present disclosure. This embodiment can be applied to the situation of recognizing a screen-off gesture, and the method can be performed by a screen-off gesture recognition apparatus. The apparatus can be implemented by software and/or hardware and can generally be integrated in a terminal.

As illustrated in FIG. 1, the method can begin at block 110. At block 110, when it is detected that the user inputs a screen-off gesture, the gesture data of the screen-off gesture from the touch chip can be read according to a set period, the gesture data including gesture coordinates corresponding to the screen-off gesture.

The screen-off gesture may be a touch gesture input by the user on the touch screen of the terminal in turned-off screen state with the screen-off gesture function enabled. It can be understood that the screen-off gesture is not limited to the touch gesture input on the touch screen, and may also be an operation detected by a sensor of the terminal. For example, gestures of shaking a smartphone side by side, sweeping over the touch screen of the smartphone, and pressing the frame of the smartphone or the like.

Figure 2A:
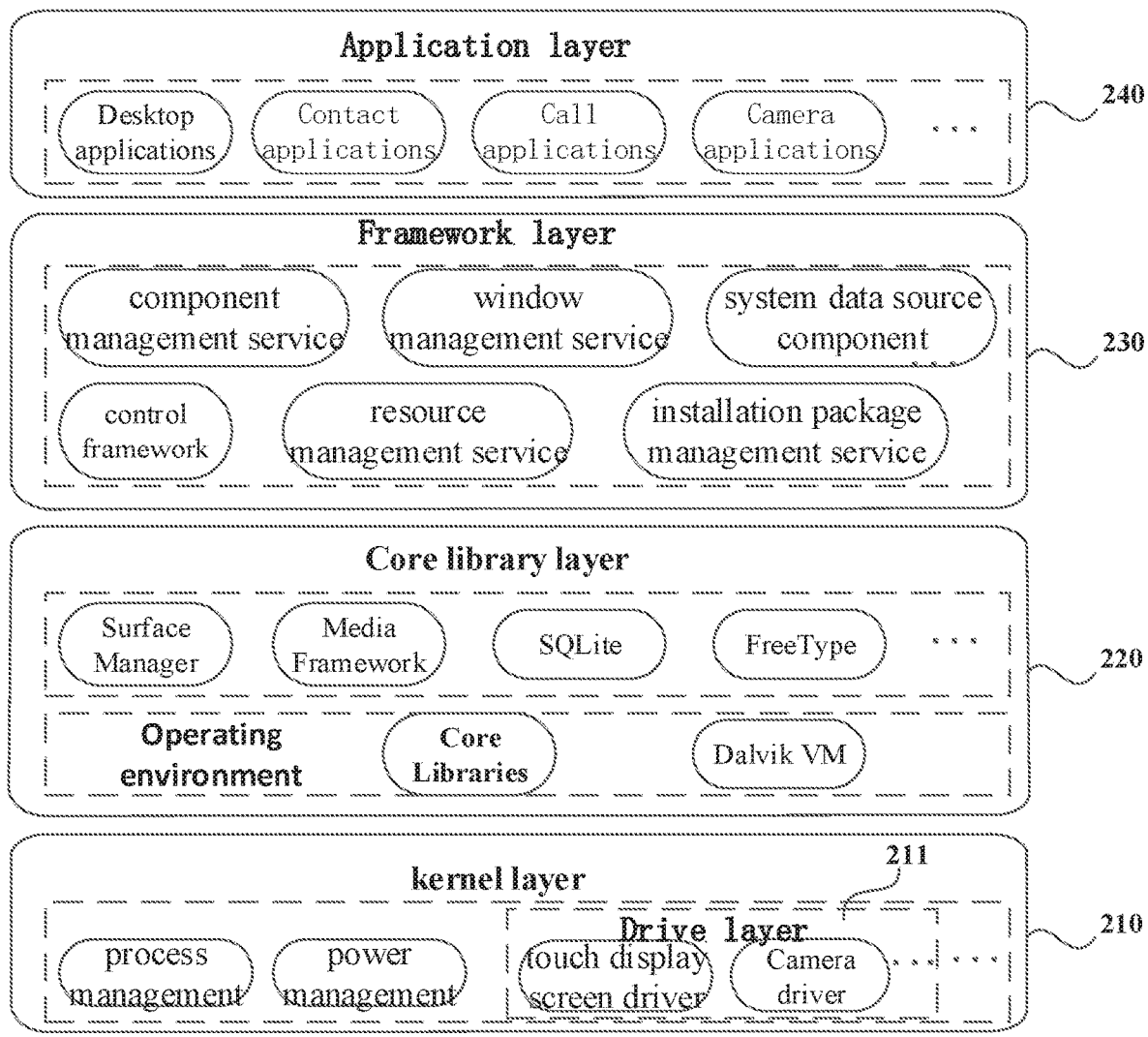
FIG. 2a is a schematic diagram of an Android system framework according to an embodiment of the present disclosure.

FIG. 2a is a schematic diagram of an Android system framework according to an embodiment of the present disclosure. Taking the terminal with an Android operating system as illustrated in FIG. 2a as an example, the implementation process of the screen-off gesture function according to the embodiments of the present disclosure is illustrated. As illustrated in FIG. 2a, the Android system framework includes, from bottom to top, a kernel layer 210, a core library layer 220, a framework layer 230, and an application layer 240. The kernel layer 210 provides core system services including security, memory management, process management, network protocol stacks, and hardware drivers or the like. The hardware driver in the kernel layer 210 is recorded as a driver layer 211, the drive layer 211 includes a touch screen driver, a camera driver, etc. The core library layer 220 includes Android Runtime and Libraries. Android Runtime provides most of the features available in the Java programming language core library, including Core Libraries and Dalvik VMs. Each Android application is an instance of a Dalvik virtual machine running in its own process. The library is provided for various components of the Android system, including the following functions: Media Framework, Surface Manager, SQLite (Relational Database Engine), and FreeType (Bitmap and Vector Font Rendering), and the various functions are exposed to developers through the framework layer 230 of the Android system. The framework layer 230 provides a series of libraries required for the development of Android applications, allowing the developers to perform rapid application development, to facilitate the reuse of components, and also to achieve individualized extensions through inheritance. The services it provides include component management services, window management services, system data source components, control frameworks, resource management services, and installation package management services etc. The application layer 240 includes various types of applications that directly interact with the user, or service programs written in the Java language and run in the background, which includes desktop applications, contact applications, call applications, camera applications, picture viewers, games, maps, web browsers, and other applications developed by the developers.

In order to better describe the process of recognizing a screen-off gesture in the related art, exemplarily, after the screen-off gesture function is enabled, a wake-up signal is generated by the touch chip when a screen-off gesture is detected, and the wake-up signal is sent to the kernel layer. The kernel layer is triggered by the wake-up signal to perform a system wake-up operation. After the system is waked up, the kernel layer calls the drive layer interrupt function to execute, the gesture data in the touch chip is read, and the gesture data that has been read is stored in a preset node of the drive layer. The touch chip is configured to output the touch sensing control signal to the touch screen to detect the touch operation, to recognize the gesture coordinates of the screen-off gesture acting on the touch screen and to store the gesture coordinates as a gesture data in its own register. The set node may be a file node. For example, it can be a virtual file node under the proc-D directory. After the data reading is completed, the drive layer determines the validity of the gesture data. There are many ways to determine the validity, which are not specifically limited in this embodiment. For example, the drive layer determines the gesture type according to the coordinate information contained in the gesture data, and the determined gesture type is stored as a gesture data in the preset node. If the gesture type is not a predetermined screen-off gesture, it is determined that the gesture data is invalid. For another example, the drive layer counts the amount of the gesture data, and it is determined that whether the amount satisfies a requirement for drawing a predetermined screen-off gesture, and if not, it is determined that the gesture data is invalid. When the data is valid, the drive layer reports a black screen event. The screen-off gesture events are transmitted to the framework layer through the core library layer, and are distributed through the framework layer to reach the application layer. When the application layer has acquired the screen-off gesture event, the gesture data is read by a preset node of the drive layer. After the preparation of the gesture data is completed, a screen-off gesture trajectory is calculated according to the coordinate information contained in the gesture data, and the screen-off gesture trajectory is drawn on the touch screen for display. Then, the application layer activates an application corresponding to the gesture type based on the gesture type in the read gesture data. The gesture type may be a gesture for implementing a certain function preset in the terminal, and may also be a user-defined gesture. For example, the gesture type may be an O, which represents activating the camera. For another example, the gesture type may be a V, which represents activating a flashlight etc.

In this embodiment, the gesture data of the screen-off gesture from the touch chip is read according to a set period, and the set period may be selected based on the actual requirement, such as 0.5 seconds or the like. The application layer reads the gesture coordinates according to a set period, and the gesture coordinates may be the coordinate values of the coordinate points determined by the drive layer according to the touch position corresponding to the user's touch operation.

At block 120, when the gesture data satisfies a preset matching condition and does not contain a preset end identifier, a screen-off gesture trajectory is determined based on the gesture coordinates that have been read.

The preset end identifier may be an identifier set after all the gesture data have been totally read by the drive layer, and it is configured to represent that the gesture data corresponding to the screen-off gesture have been totally read. For example, the preset end identifier may be character "#". The touch chip stores the gesture data corresponding to the detected screen-off gesture into its own preset register when the user inputs a screen-off gesture. "#" is added to the end of the gesture data stored in the register after detecting that the input of the screen-off gesture is completed. Since the technical solution of the embodiment of the present disclosure recognizes the screen-off gesture during the user's drawing process, if the gesture data does not contain a preset end identifier, the user's drawing process is not completed. The preset matching conditions can be used to determine whether the gesture data is valid. When the gesture data satisfies the preset matching condition, it can be determined that the gesture data that has been read is valid, and the screen-off gesture trajectory is determined based on the gesture coordinates that have been read. Specifically, a curve fitting method may be used to acquire a screen-off gesture trajectory by using gesture coordinate fitting. It should be noted that, in order to reduce the power consumption and avoid the screen from waking up, and to ensure that the input of the screen-off gesture can be continued, the screen-off gesture trajectory can be used only for application layer analysis and nothing may be displayed on the touch screen.

At block 130, the method goes to matching the screen-off gesture trajectory with each preset gesture trajectory in the preset gesture trajectory set.

The preset gesture trajectory set may be a set of at least one preset gesture trajectory stored by the system. The preset gesture trajectory may be a standard graphics trajectory provided by the system, such as including the W, M and O gesture trajectories or the like. It can also be a gesture trajectory corresponding to a user-defined custom graphic. This matching process may occur during the process of the user hasn't completed a screen-off gesture input, and it is determined whether to continue reading the gesture data or not based on the matching result. It can be determined that the user may have a misoperation or the gesture switch status corresponding to the screen-off gesture input by the user is not enabled when the screen-off gesture trajectory trend input by the user does not match the preset gesture trajectory.

At block 140, the reading operation of the gesture data is stopped when the screen-off gesture trajectory does not match any of the preset gesture trajectories in the preset gesture trajectory set.

It can be determined that the gesture input by the user is abnormal when the screen-off gesture trajectory does not match any of the preset gesture trajectories in the preset gesture trajectory set, and the reading operation of the gesture data is stopped to avoid the problem of a waste of resource caused by reading wrong data.

In the embodiment of the present disclosure, the gesture data of the screen-off gesture from the touch chip is read according to a set period when it is detected that the user inputs a screen-off gesture. When the gesture data satisfies a preset matching condition and does not contain a preset end identifier, a screen-off gesture trajectory is determined based on the gesture coordinates that have been read. Matching of the screen-off gesture trajectory with each preset gesture trajectory in the preset gesture trajectory set is performed. The reading operation of the gesture data operation is stopped when the screen-off gesture trajectory does not match any of the preset gesture trajectories in the preset gesture trajectory set. In this way, the problem of a waste of the possessing resources of the application layer and the drive layer is solved, which is resulted from that all the gesture data will be read and recognized by the drive layer, and the application layer also reads the gesture data from the drive layer when the user inputs a gesture that is not enabled or the user inputs an incorrect gesture by mistake. The technical effect of reducing the amount of data to be read and processed, and reducing the power consumption of system are achieved.

Based on the above technical solution, before detecting that a user inputs a screen-off gesture, the method further includes monitoring the switch status of each screen-off gesture in the application layer, and acquiring a gesture trajectory corresponding to at least one screen-off gesture with a switch status being enabled to form a preset gesture trajectory set.

A screen-off gesture switch is displayed at the application layer in the form of a switch control, so that the user can select to enable or disenable a screen-off gesture corresponding to the screen-off gesture switch. The application layer monitors the return value of the switch control corresponding to each screen-off gesture in the screen-off gesture setting interface, and the switch status of the screen-off gesture in the application layer is determined based on the return value of the switch control. The drive layer may monitor the switch status of each screen-off gesture in the application layer, and specifically, the drive layer may acquire the configuration information issued by the application layer. The configuration information includes the switch status. The drive layer may determine the type of the screen-off gesture with a switch status being enabled based on the configuration information and acquire the gesture trajectories corresponding to each type of the screen-off gesture. All of the gesture trajectories of which the switch status is enabled are formed into the a preset gesture trajectory set, and the preset gesture trajectory set is stored in the drive layer, such that it can be called whenever the gesture trajectory is matched. It should be noted that since the user may modify the switch status of the screen-off gesture at any time based on the actual requirement, the preset gesture trajectory set may be updated at regular intervals, for example, it may be updated every 24 hours.

In this technical solution, before matching the gesture trajectories, all of the gesture trajectories in the enabled state are formed into the gesture trajectory set. The gesture trajectory is matched and recognized in the process of the user inputting a screen-off gesture, and it can be determined whether the trend of the screen-off gesture trajectory input by the user matches the screen-off gesture trajectories that are enabled. The reading of the gesture data is stopped in time if the gesture trajectory cannot be recognized. In this way the waste of resources and the power consumption of the system are reduced.

Based on the above technical solution, the method further includes acquiring a sample screen-off gesture trajectory within a set time length when an update condition of the preset gesture trajectory set is satisfied. The sample screen-off gesture trajectory can be divided into at least two sample screen-off gesture sub-trajectories, and the preset gesture trajectory corresponding to the sample screen-off gesture trajectory can also be divided into two preset gesture sub-trajectories. The sample screen-off gesture sub-trajectory and the preset gesture sub-trajectory having the same feature points as endpoints can be compared to determine determining a deviation between them. The gesture trajectory set can be updated by using the sample gesture trajectory when the deviation exceeds the set threshold.

Figure 2B:
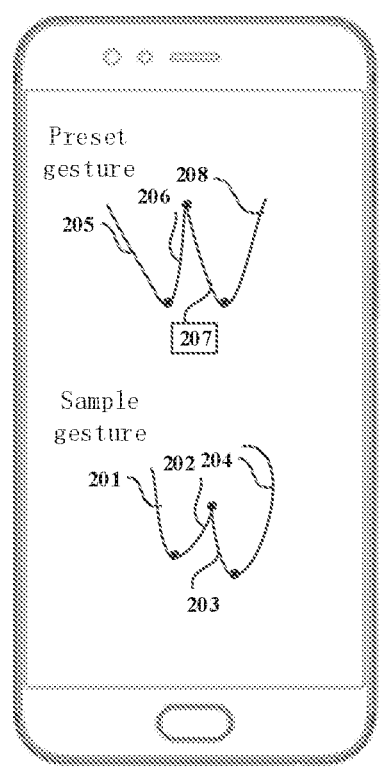
FIG. 2b is a schematic diagram of sub-trajectories of a screen-off gesture trajectory according to an embodiment of the present disclosure.

The update condition is a prerequisite for triggering a preset gesture trajectory set. It can be understood that there are many forms of update conditions, which are not limited by the embodiments of the present disclosure. For example, the update condition may be time or the like. Exemplarily, an update time may be set as an update condition when the user uses the screen-off gesture function for the first time. It can be achieved that an update instruction is generated when the use time of the screen-off gesture function reaches the update time, and the update instruction triggers the update of a preset gesture trajectory. Since the user has a certain personal habit when drawing a screen-off gesture, the gesture trajectories of the screen-off gestures acquired within a set time length are as samples, and the set time length may be a limitation on the natural time, such as one day etc. The set feature point may be the inflection point in the screen-off gesture trajectory, and each of the gesture trajectories of the screen-off gestures in the preset gesture trajectory set and the sample screen-off gestures are divided respectively into at least two sub-trajectories by using a set feature point. This is equivalent to dividing the gesture trajectory into at least two segments, of which the corresponding sub-trajectories are compared to each other and the deviation between the sub-trajectories are determined. When the deviation exceeds the preset threshold, it is indicted that the deviation between the preset gesture trajectory and the sample screen-off gesture trajectory is relatively large. At this time, the sample screen-off gesture trajectory is used to update the preset gesture trajectory set. Exemplarily, FIG. 2b is a schematic diagram of sub-gesture trajectories of a screen-off gesture trajectory according to an embodiment of the present disclosure. It should be noted that the screen-off gesture trajectory in FIG. 2b is the trajectory obtained by the drive layer recognizing the screen-off gesture in a state that the screen is turned-off, and the screen-off gesture trajectory is not displayed on the touch screen at this time. Regarding to the gesture trajectory "W", the gesture trajectory is divided into a first sample screen-off gesture sub-trajectory 201, a second sample screen-off gesture sub-trajectory 202, a third sample screen-off gesture sub-trajectory 203, and a fourth sample screen-off gesture sub-trajectory 204 by using three feature points located at the inflection points. The gesture trajectory of the screen-off gesture "W" in the preset gesture trajectory is divided into a first preset gesture sub-trajectory 205, a second preset gesture sub-trajectory 206, a third preset gesture sub-trajectory 207 and a fourth preset gesture sub-trajectory 208 by using the same feature points. The first sample screen-off gesture sub-trajectory 201 is compared with the first preset gesture sub-trajectory 205 to determine the first deviation. In the same way, the remaining three sets of the sub-trajectories are compared with each other to determine the deviation between the sub trajectories respectively. The determined deviation is compared with the set deviation threshold. If the deviation exceeds the set threshold, the gesture trajectory of the sample gesture "W" is used to replace the gesture trajectory of the screen-off gesture "W" stored in the preset gesture trajectory set. Therefore, personalizing the screen-off gestures in the preset gesture trajectory set based on the user's writing habits is realized, and the accuracy of the screen-off gesture matching process is improved.

Figure 3:
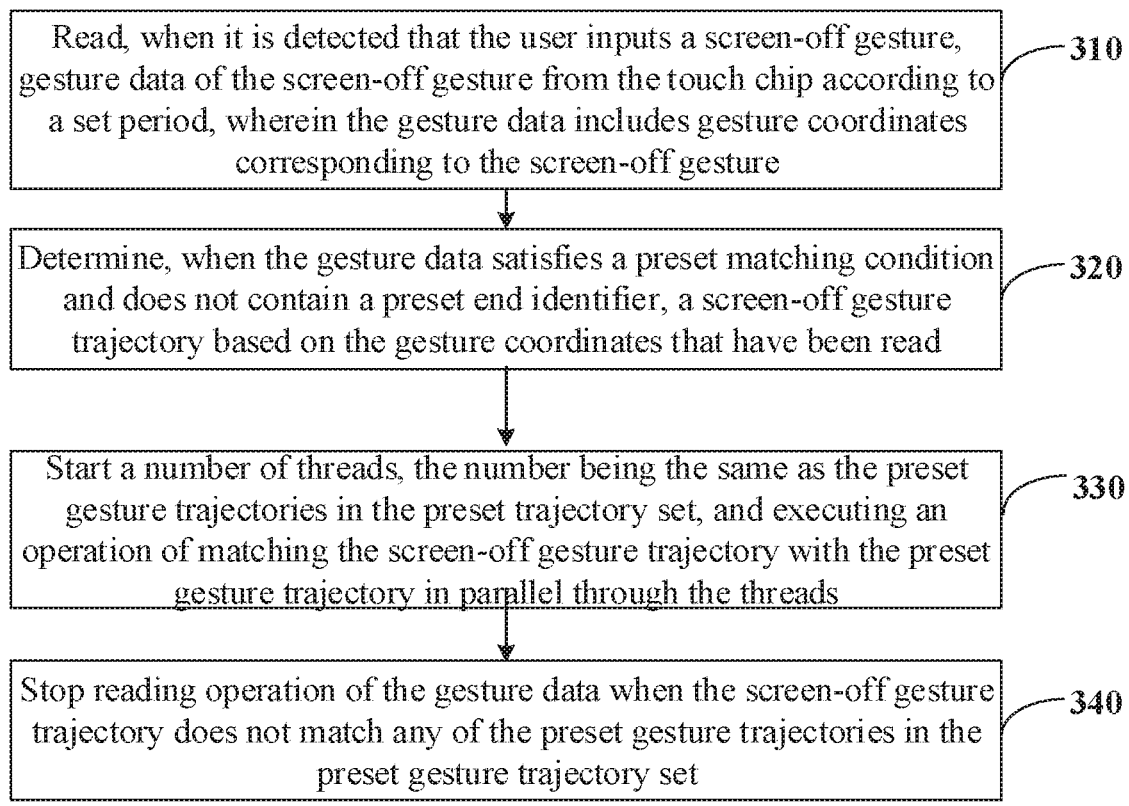
FIG. 3 is a flow diagram of another method for recognizing a screen-off gesture according to an embodiment of the present disclosure.

FIG. 3 is a flow diagram of another method for recognizing a screen-off gesture according to an embodiment of the present disclosure. This embodiment may be applicable to the situation of recognizing a screen-off gesture. The method can be performed by a screen-off gesture recognition apparatus. The apparatus can be implemented by software and/or hardware and can generally be integrated in a terminal.

As illustrated in FIG. 3, the method includes, at block 310, reading, when it is detected that the user inputs a screen-off gesture, the gesture data of the screen-off gesture from the touch chip according to a set period. The gesture data includes gesture coordinates corresponding to the screen-off gesture. The method further includes, at block 320, determining, when the gesture data satisfies a preset matching condition and does not contain a preset end identifier, a screen-off gesture trajectory based on the gesture coordinates that have been read. At block 330, the method goes to starting a number of threads, the number being the same as the preset gesture trajectories in the preset trajectory set, and executing an operation of matching the screen-off gesture trajectory with the preset gesture trajectory in parallel through the threads.

The preset trajectory set may include a plurality of preset gesture trajectories. For example, it may include the gesture trajectories such as "M", "W", "O", or "C" type, etc. The threads having same number as the preset gesture trajectories are started. For example, if the preset trajectory set includes 4 preset gesture trajectories, 4 threads are started, and the operation of matching the screen-off gesture trajectory with the preset gesture trajectory are executed in parallel. Exemplarily, matching the screen-off gesture trajectory with the gesture trajectory of "M" type may be executed by thread 1; matching the screen-off gesture trajectory with the gesture trajectory of "W" type may be executed by thread 2; matching the screen-off gesture trajectory with the gesture trajectory of "O" type may be executed by thread 3; and matching the screen-off gesture trajectory with the gesture trajectory of "C" type may be executed by thread 4. Four threads execute in parallel, which can save the time required for the matching process.

At block 340, the reading operation of the gesture data is stopped when the screen-off gesture trajectory does not match any of the preset gesture trajectories in the preset gesture trajectory set.

With the technical solution of embodiments of the present disclosure, through the operation of starting the same number of threads as the preset gesture trajectories in the preset trajectory set, and executing an operation of matching the screen-off gesture trajectory with the preset gesture trajectory in parallel in multithreads, the time required for matching the gesture trajectories is reduced. When the screen-off gesture is a screen-off gesture that the user has mistakenly input or is not enabled, it can be determined the input is incorrect in time and the gesture data is no longer read. In this way the data read amount and data report amount of the drive layer is reduced in time, and the power consumption of the system is reduced.

Figure 4:
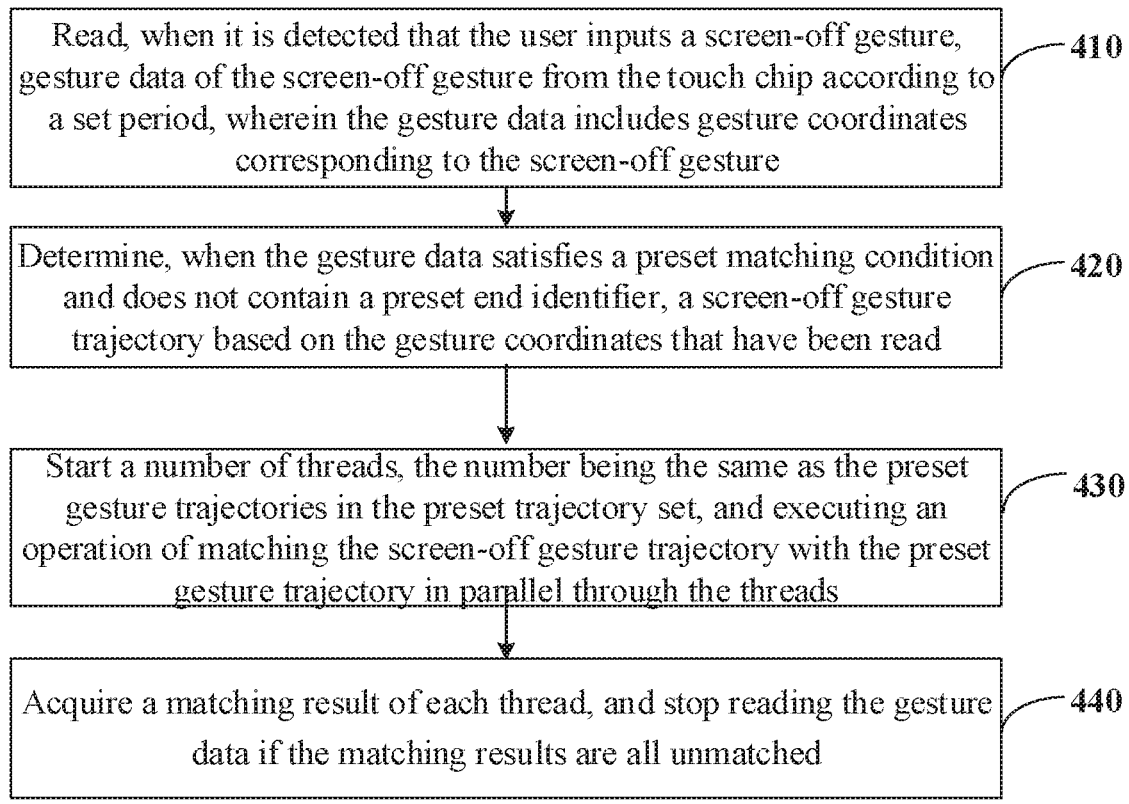
FIG. 4 is a flow diagram of another method for recognizing a screen-off gesture according to an embodiment of the present disclosure.

FIG. 4 is a flow diagram of another method for recognizing a screen-off gesture according to an embodiment of the present disclosure. This embodiment may be applicable to the situation of recognizing the screen-off gesture. The method can be performed by a screen-off gesture recognition apparatus. The apparatus can be implemented by software and/or hardware and can generally be integrated in a terminal.

As illustrated in FIG. 4, the method includes, at block 410, reading, when it is detected that the user inputs a screen-off gesture, the gesture data of the screen-off gesture from the touch chip according to a set period, the gesture data including gesture coordinates corresponding to the screen-off gesture. The method further includes, at block 420, determining, when the gesture data satisfies a preset matching condition and does not contain a preset end identifier, a screen-off gesture trajectory based on the gesture coordinates that have been read. At block 430, the method proceeds to starting a number of threads, the number being the same as the preset gesture trajectories in the preset trajectory set, and executing an operation of matching the screen-off gesture trajectory with the preset gesture trajectory in parallel through the threads. Moreover, at block 440, the method goes to acquiring a matching result of each thread, and stopping reading the gesture data if the matching results are all unmatched.

The matching results for each thread may be acquired at the same time by matching the screen-off gesture trajectory with the preset gesture trajectory by each thread, and the final matching result of the screen-off gesture is determined based on the matching result of each thread. The drive layer continues to read the gesture data and then returns to perform the matching operation of the screen-off gesture trajectory when the matching result of any one of the threads is successful. While it is determined that the screen-off gesture input by the user is incorrect if the matching result of each thread is unmatched, and the drive layer may stop reading the gesture data at this time.

With the technical solution of embodiments of the present disclosure, the final gesture trajectory matching result is determined based on the matching result of each thread, and each thread is executed in parallel. The time required for matching is saved, and the processing efficiency is improved, and the power consumption of the system is reduced.

Figure 5A:
FIG. 5a is a schematic diagram of a dialog box for a user to select whether a screen-off gesture is a mistaken input according to the embodiment of the present disclosure.
Figure 5B:
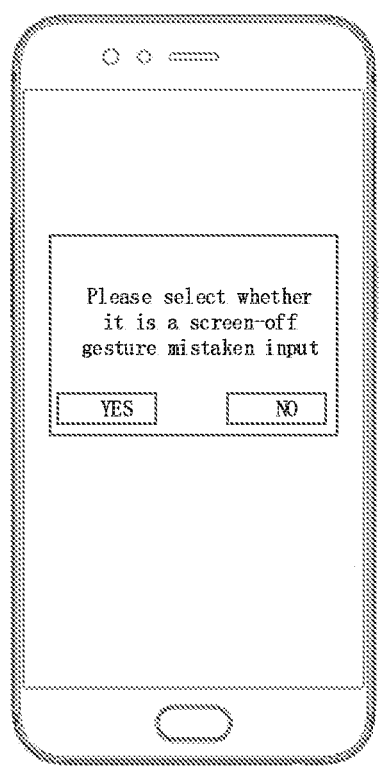
FIG. 5b is a flow diagram of another method for recognizing a screen-off gesture according to an embodiment of the present disclosure.

FIG. 5 is a flow diagram of another method for recognizing a screen-off gesture according to an embodiment of the present disclosure. This embodiment may be applicable to the situation of recognizing a screen-off gesture. The method can be performed by a screen-off gesture recognition apparatus. The apparatus can be implemented by software and/or hardware and can generally be integrated in a terminal.

As illustrated in FIG. 5, the method includes, at block 510, reading, when it is detected that a user inputs a screen-off gesture, the gesture data of the screen-off gesture from the touch chip according to a set period, the gesture data including gesture coordinates corresponding to the screen-off gesture. The method further includes, at block 520, determining, when the gesture data satisfies a preset matching condition and does not contain a preset end identifier, a screen-off gesture trajectory based on the gesture coordinates that have been read. Furthermore, the method includes at block 530, matching the screen-off gesture trajectory with each preset gesture trajectory in the preset gesture trajectory set. Moreover, the method further includes, at block 540, stopping reading operation of the gesture data when the screen-off gesture trajectory does not match any of the preset gesture trajectories in the preset gesture trajectory set. In addition, the method includes, at block 550, giving up reporting a screen-off gesture event for the screen-off gesture to the application layer, and prompting the user to choose whether the input is a mistaken input.

Since it is determined that the screen-off gesture input by the user is incorrect, it is not necessary to report the screen-off gesture event corresponding to the wrong data, and thus reporting the screen-off gesture event to the application layer is given up. At this point, it can be divided into two situations: one may be a user's misoperation and one may be that the user forgets to enable the switch corresponding to the screen-off gesture. Therefore, in the current situation, the user may be prompted to choose and determine whether it is a mistaken input. Exemplarily, the user may be prompted to select whether the screen-off gesture is a mistaken input by displaying a dialog box. FIG. 5a is a schematic diagram of a dialog box for a user to select whether a screen-off gesture is a mistaken input according to the embodiment of the present disclosure. A dialog box is displayed to prompt the user to make a selection when the gesture data reading is stopped. If the user selects "Yes", it can be determined that the screen-off gesture is a mistaken input of the user, and the gesture data that has been read by the drive layer is cleared; the drive layer is ready again to enter a state available to the screen-off gesture, so that the user can input the screen-off gesture when there is an input demand.

At 560, if the input is determined as not a mistaken input according to the selection result of the user, a setting interface for displaying the switch status of the screen-off gesture is triggered to allow the user to reset the switch status of the screen-off gesture.

If the user selects "No", it can be determined that the user mistakenly believes that he has enabled the switch corresponding to the screen-off gesture desired to recognize, but the switch is off in fact. Thus, in this case, the setting interface for displaying the status of the screen-off gesture switch is triggered so that the user can reset the switch status of the screen-off gesture. Specifically, the application layer may display a screen-off gesture switch in the form of a switch control, so that the user may select to enable or disable a screen-off gesture corresponding to the screen-off gesture switch. For example, when the user clicks the screen-off gesture function option in the setting, the display interface is switched to the screen-off gesture interface. The screen-off gesture interface includes the preset screen-off gestures (such as "O", "V", "<", "W" and "M" etc.) and their corresponding black screen switches, and the screen-off gesture interface further includes an option of customizing the screen-off gesture. If the user enables the screen-off gesture switch corresponding to the screen-off gesture "O", it represents that the screen-off gesture "O" is enabled. The user can set the screen-off gesture switch on the displayed setting interface of the screen-off gesture switch based on the actual demand.

In the technical solution of embodiments of the present disclosure, the screen-off gesture trajectory is matched and recognized in the process that the user is inputting a screen-off gesture. If it is determined that the matching of the screen-off gesture trajectory fails, it is determined that the screen-off gesture input by the user is incorrect. The reading of the gesture data is stopped, and the user is prompted to select whether it is a mistaken input. If it is determined that it is not a mistaken input, the switch status setting interface for displaying screen-off gestures is triggered so that the user may set the switch status of the screen-off gesture again. The above process takes the user's feelings into consideration to a great extent, and the user experience is improved. It also prevents the user from misunderstanding that there is a failure in gesture recognition and repeating to input the gesture which causes the waste of resources for data reading and processing, and the technical effect of reducing the power consumption of the system is achieved.

Figure 6:
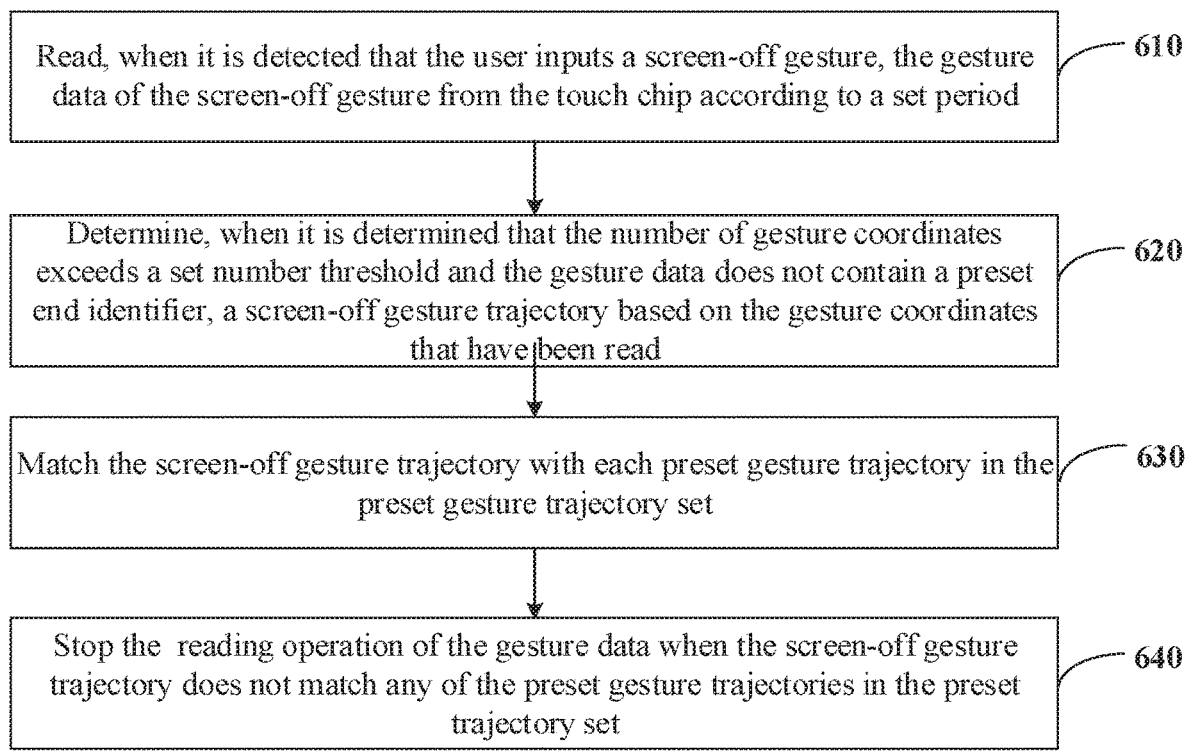
FIG. 6 is a flow diagram of another method for recognizing a screen-off gesture according to an embodiment of the present disclosure.

FIG. 6 is a flow diagram of another method for recognizing a screen-off gesture according to an embodiment of the present disclosure. This embodiment may be applicable to the situation of recognizing a screen-off gesture. The method can be performed by a screen-off gesture recognition apparatus. The apparatus can be implemented by software and/or hardware and can generally be integrated in a terminal.

As illustrated in FIG. 6, the method includes, at block 610, reading, when it is detected that the user inputs a screen-off gesture, the gesture data of the screen-off gesture from the touch chip according to a set period, the gesture data including gesture coordinates corresponding to the screen-off gesture. At block 620, the method proceeds to determining, when it is determined that the number of gesture coordinates exceeds a set number threshold and the gesture data does not contain a preset end identifier, a screen-off gesture trajectory based on the gesture coordinates that have been read.

In order to improve the referability of the result of the gesture matching operation, before determining the screen-off gesture trajectory, the preset matching conditions may be limited. Specifically, it may be limited based on the number of gesture coordinates, the reading time of the gesture data or the like. Whether the number of gesture coordinates exceeds the set number threshold or not may be set as the preset matching condition. If the number exceeds the set number threshold, the determination of the screen-off gesture trajectory can be made.

In at least one alternative embodiment, determining whether the gesture data satisfies the preset matching condition includes any one of the followings: determining whether the reading time of the gesture data exceeds a set time threshold; or determining whether the gesture data is a preset feature point, in which the preset feature point includes an inflection point; or determining a gesture type according to the gesture coordinates, and determining whether the gesture type is a preset gesture type.

If the reading time of the gesture data exceeds the set time threshold, it means that the acquired gesture data has accumulated a certain amount of time in the drive layer, and it can be determined that the gesture data satisfies the preset matching condition. Determining the screen-off gesture trajectory at this point may increase the validity. The set time threshold can be set based on the required accuracy, such as 1 minute etc. Or when a preset feature point is recognized (for example when an inflection point is recognized) included in the gesture coordinates, it can be determined that the gesture data satisfies the preset matching condition and the determination of the gesture trajectory can be made. Alternatively, a gesture type is determined according to the gesture coordinates, and when the gesture type is one of the preset gesture types, such as O type or V type, it is determined that the gesture data satisfies the preset matching condition.

At block 630, the method matches the screen-off gesture trajectory with each preset gesture trajectory in the preset gesture trajectory set.

At block 640, the reading operation of the gesture data is stopped when the screen-off gesture trajectory does not match any of the preset gesture trajectories in the preset gesture trajectory set.

In the technical solution of the embodiment of the present disclosure, the preset matching condition is set so that the data matching condition is limited. In this way, the validity of the data used in gesture trajectories matching is ensured and the efficiency of gesture trajectory matching is improved, and the unnecessary matching workload and system power consumption are reduced.

Figure 7:
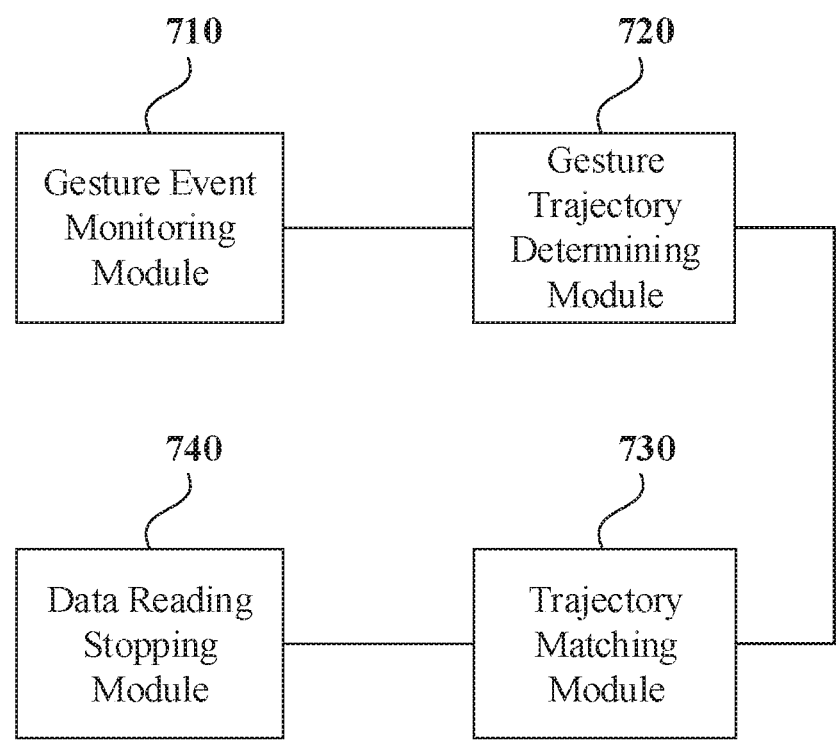
FIG. 7 is a structural block diagram of an apparatus for recognizing a screen-off gesture according to an embodiment of the present disclosure.

FIG. 7 is a structural block diagram of an apparatus for recognizing a screen-off gesture according to an embodiment of the present disclosure. The apparatus can be implemented by software and/or hardware and can generally be integrated in a terminal. As illustrated in FIG. 7, the apparatus includes a gesture event monitoring module 710, a gesture trajectory determining module 720, a trajectory matching module 730 and a data reading stopping module 740.

The gesture event monitoring module 710 is configured to read the gesture data of the screen-off gesture from the touch chip according to a set period when it is detected that the user inputs a screen-off gesture. The gesture data includes gesture coordinates corresponding to the screen-off gesture.

The gesture trajectory determining module 720 is configured to determine a screen-off gesture trajectory based on the gesture coordinates that have been read when the gesture data satisfies a preset matching condition and does not contain a preset end identifier.

The trajectory matching module 730 is configured to match the screen-off gesture trajectory with each preset gesture trajectory in the preset gesture trajectory set.

The data reading stopping module 740 is configured to stop reading the gesture data when the screen-off gesture trajectory does not match any of the preset gesture trajectories in the preset gesture trajectory set.

In the embodiments of the present disclosure, the gesture data of the screen-off gesture from the touch chip is read according to a set period when it is detected that the user inputs a screen-off gesture. When the gesture data satisfies a preset matching condition and does not contain a preset end identifier, a screen-off gesture trajectory is determined based on the gesture coordinates that have been read. Matching of the screen-off gesture trajectory with each preset gesture trajectory in the preset gesture trajectory set is performed. The reading operation of the gesture data is stopped when the screen-off gesture trajectory does not match any of the preset gesture trajectories in the preset gesture trajectory set. In this way, the problem of a waste of the possessing resources of the drive layer and the application layer is solved, which is result from all the gesture data will be read and recognized by the drive layer, and the application layer also reads the gesture data from the drive layer when the user inputs a gesture that is not enabled or the user inputs an incorrect gesture by mistake. The technical effect of reducing the amount of data to be read and processed, and reducing the power consumption of system are achieved.

In at least one alternative embodiment, the apparatus further includes a switch status monitoring module. The switch status monitoring module is specifically configured to monitor the switch status of each screen-off gesture in the application layer, and acquire a gesture trajectory corresponding to at least one screen-off gesture with a switch status being enabled to form a preset gesture trajectory set.

In at least one alternative embodiment, the apparatus further includes a trajectory set updating module. The trajectory set updating module is specifically configured to acquire a sample screen-off gesture trajectory within a set time length when the update condition of the preset gesture trajectory set is satisfied. The trajectory set updating module is further configured to divide the sample screen-off gesture trajectory into at least two sample screen-off gesture sub-trajectories, and divide the preset gesture trajectory corresponding to the sample screen-off gesture trajectory into two preset gesture sub-trajectories. The sample screen-off gesture sub-trajectory and the preset gesture sub-trajectory having the same feature points as endpoints are compared to determine a deviation between them. The trajectory set updating module is further configured to update the preset gesture trajectory set by using the sample screen-off gesture trajectory when the deviation exceeds a set threshold.

In at least one alternative embodiment, the apparatus further includes a trajectory matching module 730. The trajectory matching module 730 is specifically configured to start the same number of threads as the preset gesture trajectories in the preset trajectory set, and execute an operation of matching the screen-off gesture trajectory with the preset gesture trajectory in parallel through the threads.

In at least one alternative embodiment, the apparatus further includes a data reading stopping module 740. The data reading stopping module 740 is specifically configured to acquire the matching result of each thread, and stop reading the gesture data if the matching results are all unmatched.

In at least one alternative embodiment, the apparatus further includes a user selection prompting module. The a user selection prompting module is specifically configured to give up reporting a screen-off gesture event for the screen-off gesture to the application layer, and prompt the user to choose whether the input is a mistaken input. The user selection prompting module is further configured to clear the acquired gesture data if the input is determined as a mistaken input according to a selection result of the user. If the input is determined as not a mistaken input according to the selection result of the user, a setting interface for displaying the switch status of the screen-off gesture is triggered to allow the user to reset the switch status of the screen-off gesture.

In at least one alternative embodiment, the apparatus further includes a gesture trajectory determining module 720. The gesture trajectory determining module 720 is specifically configured to determine whether the number of the gesture coordinates exceeds a set number threshold. It can also determine whether the reading time of the gesture data exceeds a set time threshold. Alternatively, it is determined whether the gesture data include a preset feature point, in which the preset feature point includes an inflection point. Alternatively, the gesture trajectory determining module 720 is configured to determine a gesture type according to the gesture coordinates, and determine whether the gesture type is a preset gesture type.

A storage medium refers to any of various types of memory devices or storage devices. The term "storage medium" is intended to include: an installation medium, such as a CD-ROM, a floppy disks, or a tape device; a computer system memory or a random access memory, such as a DRAM, a DDR RAM, a SRAM, a EDO RAM, a Rambus RAM, etc.; a non-volatile memory, such as a flash memory, a magnetic medium (such as a hard disk or an optical storage) or the like; a registers or other similar types of memory elements. The storage medium may further include other types of memory or a combination thereof. In addition, the storage medium may be located in a first computer system in which the program is executed, or it may be located in a second computer system which is different from the first computer system. The second computer system is connected to the first computer system through a network such as the Internet. The second computer system may provide program instructions to the first computer for execution. The term "storage medium" may include two or more storage media that may reside in different locations (e.g., in different computer systems connected through a network). The storage medium may store program instructions (e.g., specifically embodied as a computer program) that are executable by one or more processors.

Certainly, for the storage medium containing computer executable instructions according to the embodiments of the present disclosure, the computer executable instructions are not limited to execute the operations of recognizing a screen-off gesture as described above, but may further execute the related operations in the method for recognizing a screen-off gesture according to any embodiment of the present disclosure.

Figure 8:
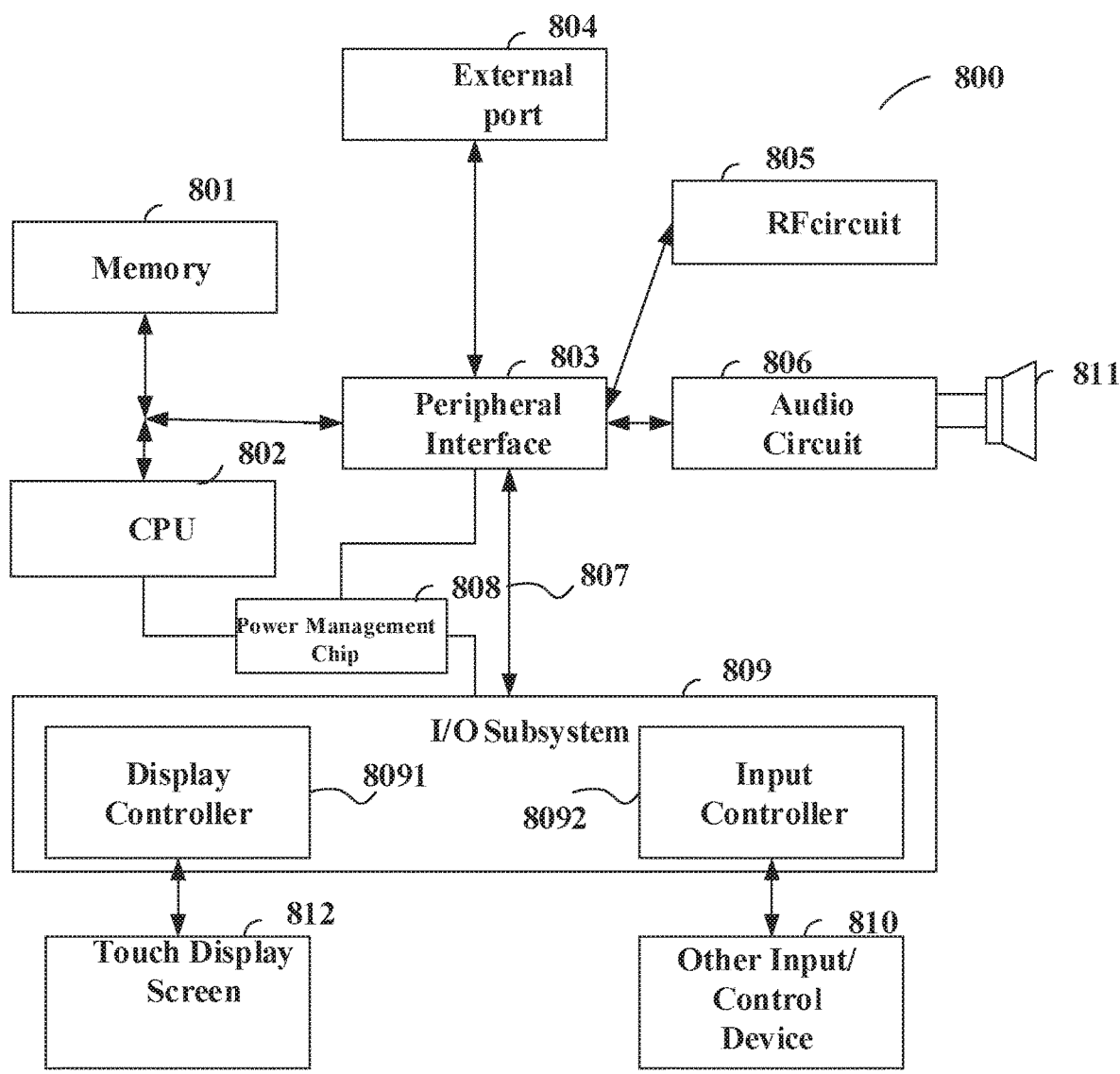
FIG. 8 is a structural schematic diagram of a terminal according to an embodiment of the present disclosure.

An embodiment of the present disclosure provides a terminal, in which an apparatus for recognizing a screen-off gesture according to an embodiment of the present disclosure may be integrated. FIG. 8 is a structural schematic diagram of a terminal according to an embodiment of the present disclosure. As illustrated in FIG. 8, the terminal may include: a housing (not shown), a memory 801, a Central Processing Unit (CPU) 802 (also referred to as a processor, hereinafter simply referred to as a CPU), and a circuit board (not shown), a touch screen 812 and a power circuit (not shown). The touch screen 812 is configured to convert a user's operation into an electrical signal and transmit the electrical signal to the processor, and display a visual output signal; the touch screen includes a touch chip. The touch chip is configured to output a touch sensing control signal to a touch screen and recognize the gesture coordinates of the screen-off gestures acting on the touch screen. The circuit board is disposed inside the space surrounded by the touch screen 812 and the housing. The CPU 802 and the memory 801 are disposed on the circuit board. The power circuit is configured to supply power to various circuits or devices of the terminal. The memory 801 is configured to store a computer program; and the CPU 802 reads and executes the computer program stored in the memory 801. The CPU 802 implements the following actions when executing the computer program. The actions include reading, when it is detected that the user inputs a screen-off gesture, the gesture data of the screen-off gesture from the touch chip according to a set period, in which the gesture data includes gesture coordinates corresponding to the screen-off gesture. The actions also include determining, when the gesture data satisfies a preset matching condition and does not contain a preset end identifier, a screen-off gesture trajectory based on the gesture coordinates that have been read. Furthermore, the actions include matching the screen-off gesture trajectory with each preset gesture trajectory in the preset gesture trajectory set, and stopping reading operation of the gesture data when the screen-off gesture trajectory does not match any of the preset gesture trajectories in the preset gesture trajectory set.

The terminal further includes: a peripheral interface 803, an RF (Radio Frequency) circuit 805, an audio circuit 806, a speaker 811, a power management chip 808, an input/output (I/O) subsystem 809, other input/control device 810 and an external port 804. These components communicate through one or more communication buses or signal lines 807.

It should be appreciated that the illustrated terminal 800 is merely one example of the terminal and that the terminal 800 may have more or fewer components than that shown in the figure, and the terminal 800 may combine two or more components, or may have different component configurations. The various components shown in the figures may be implemented in hardware, software, or in a combination of hardware and software including one or more signal processing and/or application specific integrated circuits.

The following describes in detail that the terminal integrated with the device for recognizing a screen-off gesture according to this embodiment, and a mobile phone is used as an example.

The memory 801; the memory 801 can be accessed by the CPU 802, the peripheral interface 803 or the like. The memory 801 may include a high-speed random access memory, and may further include a non-volatile memory, such as one or more disk storage devices, flash memory devices, or other volatile solid-state storage devices.

The peripheral interface 803 may connect the input and output peripherals of the device to the CPU 802 and the memory 801.

The I/O subsystem 809 may connect the input and output peripherals on the device, such as the touch screen 812 and other input/control devices 810, to the peripheral interface 803. The I/O subsystem 809 may include a display controller 8091 and one or more input controllers 8092 for controlling other input/control devices 810. One or more input controllers 8092 receive electrical signals from other input/control devices 810 or transmit electrical signals to other input/control devices 810. Other input/control devices 810 may include physical buttons (press buttons, rocker buttons, etc.), dials, slide switches, joysticks and click rollers. It should be noted that the input controller 8092 may be connected to any of the followings: a keyboard, an infrared port, a USB interface, and a pointing device such as a mouse.

The touch screen 812 is an input interface and an output interface between a user terminal and a user, and displays a visual output to the user. The visual output may include graphics, text, icons, video etc.

The display controller 8091 in the I/O subsystem 809 receives an electrical signal from the touch screen 812 or transmits an electrical signal to the touch screen 812. The touch screen 812 detects a touch on the touch screen. The display controller 8091 converts the detected touch into an interaction with a user interface object displayed on the touch screen 812, i.e., realizing a human-machine interaction. The user interface objects displayed on the touch screen 812 may be icons for running games, icons networked to corresponding networks or the like. It should be noted that the device may also include a light mouse. The light mouse is a touch-sensitive surface that does not display the visual output, or an extension of a touch-sensitive surface formed by the touch screen.

The RF circuit 805 is mainly configured to establish a communication between a mobile phone and a wireless network (i.e., the network side) and realize the data receiving and transmitting between the mobile phone and the wireless network. For example, transmitting and receiving text messages, emails, etc. Specifically, the RF circuit 805 receives and transmits RF signals. The RF signal is also referred to as an electromagnetic signal. The RF circuit 805 converts the electrical signal into an electromagnetic signal or converts the electromagnetic signal into an electrical signal, and communicates with the communication network and other devices through the electromagnetic signal. The RF circuit 805 may include known circuits for performing these functions, which include but are not limited to an antenna system, an RF transceiver, one or more amplifiers, a tuner, one or more oscillators, a digital signal processor, a CODEC (COder-DECoder, codec) chipset, a subscriber identification module (SIM) etc.

The audio circuit 806 is mainly configured to receive audio data from the peripheral interface 803, convert the audio data into an electrical signal, and transmit the electrical signal to the speaker 811.

The speaker 811 is mainly configured to recover the voice signal received by the mobile phone from the wireless network through the RF circuit 805 to sound and play the sound to the user.

The power management chip 808 is configured to supply power to the hardware that is connected to the CPU 802, the I/O subsystem and the peripheral interface, and perform power management.

According to the terminal provided by the embodiment of the present disclosure, the problem of a waste of the possessing resources of the drive layer and the application layer is solved, which is resulted from that all the gesture data is read and recognized by the drive layer, and the application layer also reads the gesture data from the drive layer when the user inputs a gesture that is not enabled or the user inputs an incorrect gesture by mistake. The technical effects of reducing the amount of data to be read and processed, and reducing the power consumption of system are achieved.

The apparatus described above can perform the apparatus, the storage medium, and the terminal for recognizing a screen-off gesture provided by all the foregoing embodiments of the present disclosure, and has the corresponding functional modules and beneficial effects of performing the above method for recognizing a screen-off gesture. For the technical details not described in detail in this embodiment, reference may be made to the method for recognizing a screen-off gesture provided by all the foregoing embodiments of the present disclosure.

Note that the above is merely preferred embodiments and applied technical principles of the present disclosure. Those skilled in the art will understand that the present disclosure is not limited to the specific embodiments described herein, and various obvious changes, adjustments, and substitutions can be made by those skilled in the art without departing from the scope of the present disclosure. Therefore, although the present disclosure has been described in more detail through the above embodiments, the present disclosure is not limited to the above embodiments. Many other equivalent embodiments may also be included without departing from the concept of the present disclosure, and the scope of the disclosure is determined by the appended claims.

The invention claimed is:

1. A method for recognizing a screen-off gesture, comprising:

reading, when it is detected that a user inputs a screen-off gesture, gesture data of the screen-off gesture from a touch chip according to a set period, wherein the gesture data includes gesture coordinates corresponding to the screen-off gesture;

determining, when the gesture data satisfies a preset matching condition and does not contain a preset end identifier, a screen-off gesture trajectory based on the gesture coordinates that have been read;

matching the screen-off gesture trajectory with each preset gesture trajectory in a preset gesture trajectory set when reading the gesture data from the touch chip; and stopping the reading operation of the gesture data when the screen-off gesture trajectory does not match any of the preset gesture trajectories in the preset gesture trajectory set, wherein the method further comprises:

acquiring a sample screen-off gesture trajectory within a set time length when an update condition of the preset gesture trajectory set is satisfied;

recognizing the sample screen-off trajectory corresponding to one of the preset screen-off gesture trajectories;

in response to the recognizing, dividing the sample screen-off gesture trajectory into at least two sample screen-off gesture sub-trajectories, and dividing the preset gesture trajectory corresponding to the sample screen-off gesture trajectory into the same number of preset gesture sub-trajectories;

comparing each sample screen-off gesture sub-trajectory with a corresponding preset gesture sub-trajectory having the same feature points as endpoints, and determining a deviation between the sample screen-off gesture sub-trajectory and the preset gesture sub-trajectory; and updating the preset gesture trajectory set by using the sample screen-off gesture trajectory when the deviation exceeds a set threshold.

2. The method of claim 1, wherein before detecting, the method further comprises:
monitoring a switch status of each screen-off gesture in an application layer; and
acquiring a gesture trajectory corresponding to at least one screen-off gesture with a switch status being enabled to form a preset gesture trajectory set.

3. The method of claim 1, wherein matching the screen-off gesture trajectory with each preset gesture trajectory in the preset gesture trajectory set comprises:
starting a number of threads, the number being the same as the preset gesture trajectories in the preset trajectory set, and executing an operation of matching the screen-off gesture trajectory with the preset gesture trajectory in parallel through the threads.

4. The method of claim 3, wherein stopping the reading operation of the gesture data when the screen-off gesture trajectory does not match any of the preset gesture trajectories in the preset gesture trajectory set comprises:
acquiring a matching result of each thread, and stopping reading the gesture data if the matching results are all unmatched.

5. The method of claim 1, wherein after stopping the reading operation of the gesture data, the method further comprises:
giving up reporting a screen-off gesture event for the screen-off gesture to the application layer, and prompting the user to choose whether an input is a mistaken input;
clearing the acquired gesture data if the input is determined as a mistaken input according to a selection result of the user.

6. The method of claim 5, further comprising:
if the input is determined as not a mistaken input according to the selection result of the user, triggering a setting interface for displaying the switch status of the screen-off gesture to allow the user to reset the switch status of the screen-off gesture.

7. The method according to claim 1, wherein determining whether the gesture data satisfies the preset matching condition comprises:
determining whether the number of the gesture coordinates exceeds a set number threshold.

8. The method according to claim 1, wherein determining whether the gesture data satisfies the preset matching condition further comprises:
determining whether a reading time of the gesture data exceeds a set time threshold.

9. The method according to claim 1, wherein determining whether the gesture data satisfies the preset matching condition further comprises:
determining whether the gesture data includes a preset feature point, wherein the preset feature point includes an inflection point.

10. A terminal comprises: a touch screen, a memory, a possessor, and a computer program stored on memory and configured to be executed by the processor, wherein the touch screen includes a touch chip, wherein when the computer program is executed by the processor, the processor is caused to implement a method for recognizing a screen-off gesture, the method comprises:
reading, when it is detected that a user inputs a screen-off gesture, gesture data of the screen-off gesture from a touch chip according to a set period, wherein the gesture data includes gesture coordinates corresponding to the screen-off gesture;
determining, when the gesture data satisfies a preset matching condition and does not contain a preset end identifier, a screen-off gesture trajectory based on the gesture coordinates that have been read;
matching the screen-off gesture trajectory with each preset gesture trajectory in a preset gesture trajectory set when reading the gesture data from the touch chip; and
stopping the reading operation of the gesture data when the screen-off gesture trajectory does not match any of the preset gesture trajectories in the preset gesture trajectory set,
wherein the method further comprises:
acquiring a sample screen-off gesture trajectory within a set time length when an update condition of the preset gesture trajectory set is satisfied;
recognizing the sample screen-off trajectory corresponding to one of the preset screen-off gesture trajectories;
in response to the recognizing, dividing the sample screen-off gesture trajectory into at least two sample screen-off gesture sub-trajectories, and dividing the preset gesture trajectory corresponding to the sample screen-off gesture trajectory into the same number of preset gesture sub-trajectories;
comparing each sample screen-off gesture sub-trajectory with a corresponding preset gesture sub-trajectory having the same feature points as endpoints, and determining a deviation between the sample screen-off gesture sub-trajectory and the preset gesture sub-trajectory; and
updating the preset gesture trajectory set by using the sample screen-off gesture trajectory when the deviation exceeds a set threshold.

11. The terminal of claim 10, wherein before detecting, the method further comprises:
monitoring a switch status of each screen-off gesture in an application layer; and
acquiring a gesture trajectory corresponding to at least one screen-off gesture with a switch status being enabled to form a preset gesture trajectory set.

12. The terminal of claim 10, wherein matching the screen-off gesture trajectory with each preset gesture trajectory in the preset gesture trajectory set comprises:
starting a number of threads, the number being the same as the preset gesture trajectories in the preset trajectory set, and executing an operation of matching the screen-off gesture trajectory with the preset gesture trajectory in parallel through the threads.

13. The terminal of claim 12, wherein stopping the reading operation of the gesture data when the screen-off gesture trajectory does not match any of the preset gesture trajectories in the preset gesture trajectory set comprises:
acquiring a matching result of each thread, and stopping reading the gesture data if the matching results are all unmatched.

14. The terminal of claim 10, wherein after stopping the reading operation of the gesture data, the method further comprises:
giving up reporting a screen-off gesture event for the screen-off gesture to the application layer, and prompting the user to choose whether an input is a mistaken input;
clearing the acquired gesture data if the input is determined as a mistaken input according to a selection result of the user.

15. The terminal of claim 14, further comprising:
if the input is determined as not a mistaken input according to the selection result of the user, triggering a setting interface for displaying the switch status of the screen-off gesture to allow the user to reset the switch status of the screen-off gesture.

16. The terminal of claim 10, wherein determining whether the gesture data satisfies the preset matching condition comprises:

determining whether the number of the gesture coordinates exceeds a set number threshold.

17. The terminal according to claim 10, wherein determining whether the gesture data satisfies the preset matching condition further comprises:

determining whether a reading time of the gesture data exceeds a set time threshold.

18. The terminal according to claim 10, wherein determining whether the gesture data satisfies the preset matching condition further comprises:

determining whether the gesture data includes a preset feature point, wherein the preset feature point includes an inflection point.

19. A non-transitory computer-readable storage medium on which a computer program is stored, wherein the program is executed by a processor to implement a method for recognizing a screen-off gesture, the method comprises:

reading, when it is detected that a user inputs a screen-off gesture, gesture data of the screen-off gesture from a touch chip according to a set period, wherein the gesture data includes gesture coordinates corresponding to the screen-off gesture;

determining, when the gesture data satisfies a preset matching condition and does not contain a preset end identifier, a screen-off gesture trajectory based on the gesture coordinates that have been read;

matching the screen-off gesture trajectory with each preset gesture trajectory in a preset gesture trajectory set when reading the gesture data from the touch chip; and stopping the reading operation of the gesture data when the screen-off gesture trajectory does not match any of the preset gesture trajectories in the preset gesture trajectory set, wherein the method further comprises:

acquiring a sample screen-off gesture trajectory within a set time length when an update condition of the preset gesture trajectory set is satisfied;

recognizing the sample screen-off trajectory corresponding to one of the preset screen-off gesture trajectories;

in response to the recognizing, dividing the sample screen-off gesture trajectory into at least two sample screen-off gesture sub-trajectories, and dividing the preset gesture trajectory corresponding to the sample screen-off gesture trajectory into the same number of preset gesture sub-trajectories;

comparing each sample screen-off gesture sub-trajectory with a corresponding preset gesture sub-trajectory having the same feature points as endpoints, and determining a deviation between the sample screen-off gesture sub-trajectory and the preset gesture sub-trajectory; and updating the preset gesture trajectory set by using the sample screen-off gesture trajectory when the deviation exceeds a set threshold.

\* \* \* \* \*